Aug. 25, 1964     F. REIFENHAUSER     3,145,419
NOZZLE FOR A PLASTIC EXTRUDER
Filed May 9, 1963
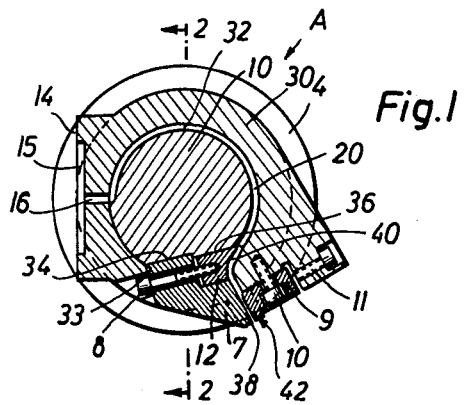
Fig.1
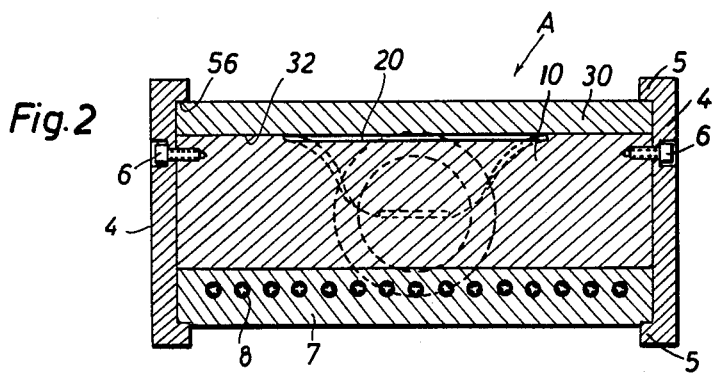
Fig.2
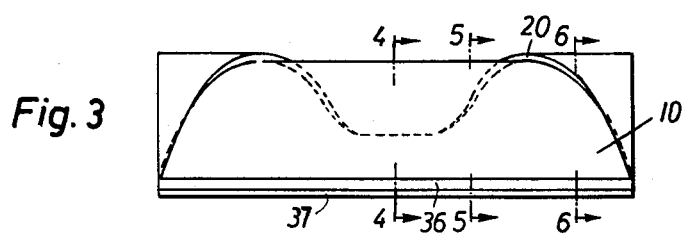
Fig.3
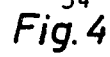    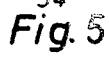    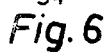
Fig.4     Fig.5     Fig.6
INVENTOR
FRITZ REIFENHAUSER
BY
Tilberry & Body United States Patent Office 3,145,419
Patented Aug. 25, 1964

3,145,419
NOZZLE FOR A PLASTIC EXTRUDER
Fritz Reifenhauser, Troisdorf, Bezirk Cologne, Germany, assignor to Reifenhauser K.G., Troisdorf, Bezirk Cologne, Germany
Filed May 9, 1963, Ser. No. 279,125
Claims priority, application Germany May 10, 1962
8 Claims. (Cl. 18—12)

The present invention pertains to the art of extruding plastic and more particularly to a nozzle device for a plastic extruding machine, hereinafter called an extruder.

The present invention is particularly applicable for use as an accessory positioned over the orifice of a plastic extruder which accessory substantially increases the width of the mass of plastic material issuing from the extruder to produce a thin plastic film and the invention will be discussed with particular reference thereto; however, it is to be appreciated that the invention has much broader applications and may be used in other environments for increasing the width of material issuing from the outlet orifice of an extruder.

In producing thin sheets of plastic material, it is common practice to place an auxiliary nozzle device over the outlet orifice of a conventional extruder having internally rotating feeding screws, which auxiliary nozzle device has heretofore comprised two plates bolted together. One of the plates was milled, or otherwise machined, to produce an inner channel having a gradually increasing width. The smaller end of the channel had a cross-section which substantially matched the shape of the extruder orifice; and the larger end of the channel had a shape, both width and thickness, that corresponded with the desired shape of the plastic sheet to be extruded. This arrangement was somewhat satisfactory when the reduction in thickness of the plastic material being extruded was not drastic; however, when the exit end of the channel was very thin and quite wide, strong hydraulic forces were created within the nozzle device, which forces were often of such a magnitude that they would actually increase the exit thickness of the plastic material by deforming the plates forming the nozzle device.

To correct this disadvantage of the prior nozzle devices, it was necessary to provide the exit end of such a nozzle device with reinforcing means such as longitudinally extending braces known as "noses" or "lips" which braces were positioned on opposite sides of the nozzle to limit the deformation of the plates. Further, these braces were provided with mechanisms whereby they could be adjustable to increase the strength of the braces supporting the hydraulic forces within the channel. These arrangements for preventing enlargement of the exit opening of such a nozzle device were complicated and expensive; and, in addition, they ofen allowed small variations in the outlet width which variations were not detected until a substantial amount of defective sheet had been produced.

The present invention is directed toward a nozzle device for overcoming the above-mentioned disadvantages of the prior art and others, which device includes a channel gradually changing from the cross-section of the outlet orifice of the extruder to the cross-section of the flat strip to be extruded and so constructed that it can withstand high hydraulic forces within the channel. In accordance with the invention, the channel is formed between a cylindrical core and a housing having a cylindrical bore therein so that the channel is sandwiched between the core and the housing. Preferably, the channel is machined within the outer surface of the inner cylindrical core.

In accordance with a more specific aspect of the present invention, there is provided a nozzle device for a plastic extruder having an outlet orifice which device comprises a generally cylindrical core, a casing having a cylindrical bore for receiving the core, and an extruding channel extending around the circumference of the core from a first position at which the width of the channel substantially matches the width of the outlet orifice to a second position at which the width of the channel is substantially greater than the width at the first position, means communicating the orifice to the first position of the channel through the casing and means for allowing plastic to pass from the second position of the channel through the casing.

By constructing the nozzle device in accordance with the present invention, the extrusion channel is not bound by two flat plates of great length; to the contrary, in accordance with the present invention, the channel is supported between two curvilinear members which are defined by the central cylindrical core and the outer housing or casing. The forces which are created in a radial direction cause only tensile stresses in the outer housing and then do not cause substantial bending forces as was the situation when two flat plates defined the opposite sides of the channel. Consequently, the stresses caused by the hydraulic pressure within the cylindrical channel cannot cause elastic deformation because these stresses are tensile in nature, instead of bending, and they are distributed over a substantial portion of the casing periphery. The stresses at any location on the housing will remain far below the limits of the tensile stresses which can be absorbed by the material forming the housing. Possible bending stresses which may occur at the vicinity of the channel outlet are of low magnitude and cannot cause bending of the material forming the housing.

The primary object of the present invention is the provision of a nozzle device for increasing the width of the material issuing from the outlet orifice of a plastic extruder which device is economical to produce, readily adaptable for use on a conventional extruder, and not subject to destructive stresses adjacent the end of a nozzle from which the plastic material issues.

Another object of the present invention is the provision of such a device which has an exit slot or opening which is more stable in width than known devices of this general type.

Yet another object of the present invention is the provision of such a device as defined above which device comprises a plastic receiving channel of gradually increasing width between a cylindrical core and the cylindrical bore of an outer casing or housing.

These and other objects and advantages will become apparent from the following description used to illustrate the preferred embodiment of the present invention as read in connection with the accompanying drawings in which:

FIGURE 1 is a cross-sectional end view illustrating the preferred embodiment of the present invention;

FIGURE 2 is a cross-sectional, side view taken generally along line 2—2 of FIGURE 1;

FIGURE 3 is a side elevational view illustrating the inner core of the present invention; and FIGURES 4–6 are cross-sectional views taken generally along lines 4—4, 5—5 and 6—6, respectively of FIGURE 3.

Referring now to the drawings, wherein the showings are for the purpose of illustrating a preferred embodiment of the present invention only and not for the purpose of limiting same, FIGURES 1 and 2 show a nozzle device for a plastic extruder having an outlet orifice so that the device can be used as an accessory to change the cross-sectional width of the material issuing from the extruder from a substantially narrow width to a wide width as necessary in the production of thin plastic films. In accordance with the preferred embodiment of the present invention as shown, the apparatus A includes a cylindrical core 10 having a channel 20 provided therein which channel has a gradually increasing width as it extends over the circumference of the cylindrical core as is best shown in FIGURE 3. The channel 20 may not only be gradually increasing in width, as shown, but it may also be gradually decreasing in depth so that the cross-sectional area remains somewhat constant.

Surrounding the core 10, and thus closing the channel 20, there is provided a casing or housing 30 having an internal generally cylindrical bore 32 which coacts with the channel 20 to form a passage having a gradually increasing width. At the more narrow end of the channel 20 there is provided, on casing 30, a boss 14 adapted to be secured onto the outlet end of a conventional plastic extruder and including a recess 15 which will fit over the end of the extruder. Further, extending through the casing 30 there is provided an inlet passage 16 having a cross-sectional area substantially matching the cross-sectional area of the orifice on the extruder machine and corresponding generally to the width of the channel 20 at this location on core 10. Accordingly, when the boss 14 is secured against the outlet end of the extruder, the inlet passage 16 generally aligns itself with the outlet orifice of the extruder so that material forced from the extruder passes into the narrow end of channel 20 through the passage 16.

To properly align the core 10 within the bore 32, in accordance with the illustrated embodiment of the present invention, there is provided at each end of the core 10 a plate 4 having a recess 5 which is adapted to surround the casing 30. To secure the end plates onto the core, there are provided spaced bolts 6.

FIGURES 3-6 illustrate in greater detail the channel 20 and how it can be provided on the outer surface of the cylindrical core 10.

Adjacent the larger end of channel 20, there is provided an opening 33 in casing 30 which opening is generally opposite the stepped lands 34, 36 on one edge of the core 10. The first of these lands 34 receives a longitudinally extending reinforcing brace 7 which, in the art, is termed a "nose." The nose has an outlet surface 38 communicated with channel 20 by a path over the surface 40 of an adjustable apron 12 which apron can be positioned with respect to the end of channel 20 by the adjusting bolts 8. Accordingly, as plastic material issues from the exit end of channel 20, its circumferential direction is changed by surface 40 of apron 12 and it then passes out over the surface 38 of nose 7.

To define the thickness of the issuing sheet, there is provided another longitudinally extending brace 9 having a surface 42 spaced slightly from surface 38. This latter mentioned brace is referred to as lip 9. To adjust the lip so that the spacing between surfaces 38, 42 can be accurately controlled, the lip is provided with locking bolts 10 spaced along the length thereof and a plurality of adjusting bolts 11. Accordingly, the bolts 10 can be loosened and the bolts 11 can be adjusted to change the width of the slot formed by surfaces 38, 42.

The operation of the device A is easily appreciated from the drawings. Plastic material is forced from an extruder, onto which the device is attached, through the passage 16 into the channel 20. In the channel, the plastic material is forced into an ever-widening sheet which sheet is finally sized by being passed through the slot formed by surfaces 38, 42.

It is within the contemplation of the present invention to make the core 10 in a plurality of sections, two of which are preferred, which sections are held within the bore 32 by appropriate aligning means such as a key between the bore and the outer surface of core 10. In the present invention, the nose 7 generally aligns the core 10 in an angular position within the bore 32; however, it is possible to also provide a key between the core and the casing 30.

It is also within the scope of the invention to provide the channel 20 within the casing 30 instead of machining the channel on the outer periphery of cylindrical core 10. Of course, this would increase the machining difficulties and for this reason, the provision of the channel on the core 10 is preferred.

The inherent cylindrical shape of the channel 20 is sufficient to absorb the forces caused by the high hydraulic pressure within the channel; however, the provision of the nose 7 and lip 9 further strengthens the outlet end of channel 20 and also provides a convenient way of changing the direction of the material flowing through channel 20. Further, this arrangement allows convenient adjustment of the final thickness of the plastic material issuing from the apparatus A.

Of course, the apparatus A can be provided with a variety of heating elements so that the material within channel 20 remains in an easily worked condition.

To change the size of channel 20, one plate 4 is removed and the core 10 is forced axially from the bore 32. Then another core having the desired channel size is inserted within bore 32. This can be accomplished without substantial delay. This is a distinct advantage when changing from one film size to another so that the material in the extruder will not deteriorate during the lapse of time required to change the core.

It is appreciated that the present invention has been described in connection with a certain structural embodiment; however, various changes may be made in the illustrated embodiment without departing from the intended spirit and scope of the present invention as defined by the appended claims.

Having thus described my invention, I claim:

1. A nozzle device for a plastic extruder having an outlet orifice comprising a generally cylindrical core, a casing having a cylindrical bore for receiving said core, an extruding channel extending around the circumference of said core from a first position where the width of said channel substantially matches the width of the outlet orifice to a second position where the width of said channel is substantially greater than the width at said first position, means communicating said orifice to said first position of the channel through said casing and means for allowing plastic to pass from said second position through said casing.

2. A nozzle device as defined in claim 1 wherein said extruding channel is provided in said cylindrical core and the surface of said bore closes said channel.

3. A nozzle device as defined in claim 1 wherein said extrusion channel is provided in said cylindrical bore and the surface of said cylindrical core closes said channel.

4. A nozzle device as defined in claim 1 wherein said channel has a gradually decreasing thickness from said first position to said second position.

5. A nozzle device as defined in claim 1 wherein said core comprises two separate members, each of said members having an abutting surface generally perpendicular to the axis of said core, and means for maintaining said abutting surfaces together during operation of said device.

6. A nozzle device as defined in claim 1 wherein said second means includes an opening in said casing at said second position, a first and second reinforcing brace, said braces defining an exit slot and means for communicating said slot with said second position of said channel.

7. A nozzle device as defined in claim 6 wherein at least one of said braces is adjustable to change the thickness of said slot.

8. A nozzle device comprising a generally cylindrical core member, a casing member having a generally cylindrical bore for receiving said core, a cylindrically extending, extrusion channel formed in one of said members and covered by the other of said members, said channel having an entrant end, an exit end and a gradually increasing width from said entrant end to said exit end.

No references cited.